United States Patent
Zhu et al.

(10) Patent No.: US 9,112,426 B2
(45) Date of Patent: Aug. 18, 2015

(54) HIGH POWER-FACTOR CONTROL CIRCUIT AND METHOD FOR SWITCHED MODE POWER SUPPLY

(75) Inventors: Shihai Zhu, Shanghai (CN); Zeqiang Chen, Shanghai (CN); Xuegang Ren, Shanghai (CN); Yajiang Zhu, Shanghai (CN)

(73) Assignee: BCD Semiconductor Manufacturing CO., LTd., Shanghai (CN)

( * ) Notice: Subject to any disclaimer, the term of this patent is extended or adjusted under 35 U.S.C. 154(b) by 749 days.

(21) Appl. No.: 13/050,236

(22) Filed: Mar. 17, 2011

(65) Prior Publication Data

US 2012/0056551 A1    Mar. 8, 2012

(30) Foreign Application Priority Data

Sep. 6, 2010 (CN) .......................... 2010 1 0275190

(51) Int. Cl.
*H05B 41/282* (2006.01)
*H02M 1/42* (2007.01)
*H05B 33/08* (2006.01)

(52) U.S. Cl.
CPC ......... *H02M 1/4258* (2013.01); *H05B 33/0818* (2013.01); *Y02B 20/347* (2013.01); *Y02B 70/126* (2013.01)

(58) Field of Classification Search
USPC ..................... 315/276, 209 R, 291, 294, 297; 363/21.12, 21.18
See application file for complete search history.

(56) References Cited

U.S. PATENT DOCUMENTS

| | | | | |
|---|---|---|---|---|
| 5,696,670 | A * | 12/1997 | Roederer et al. | 363/21.18 |
| 5,990,753 | A * | 11/1999 | Danstrom et al. | 331/143 |
| 2010/0213857 | A1* | 8/2010 | Fan | 315/186 |
| 2010/0295470 | A1* | 11/2010 | Koutensky | 315/294 |
| 2011/0037414 | A1* | 2/2011 | Wang et al. | 315/297 |

OTHER PUBLICATIONS

Texas Instruments, Current Mode PWM Controller, Spec sheet, Jun. 2007.*

* cited by examiner

*Primary Examiner* — Douglas W Owens
*Assistant Examiner* — Jonathan Cooper

(57) ABSTRACT

A switch mode power supply (SMPS) system includes a rectifying circuit for coupling to an AC input voltage and a transformer having a primary winding for coupling to the rectifying circuit and a secondary winding coupled to the primary winding. The system also has a power switch coupled to the primary winding and a control circuit coupled to the power switch. The control circuit is configured to control current flow in the primary winding such that an envelop waveform formed by peak points of current pulses are in phase with the magnitude of the AC input voltage. Moreover, the SMPS system is configured to provide a constant average output current.

16 Claims, 14 Drawing Sheets

HIGH POWER-FACTOR CONTROL CIRCUIT AND METHOD FOR SWITCHED MODE POWER SUPPLY

CROSS-REFERENCES TO RELATED APPLICATIONS

This application claims benefit and priority of Chinese Patent Application No. 201010275190.X, filed Sep. 6, 2010, commonly owned and incorporated herein by reference in its entirety for all purposes.

BACKGROUND OF THE INVENTION

The present invention relates generally to switch mode power supply (SMPS) systems. More particularly, embodiments of the invention relate to methods and circuits for controlling and improving the power factor of SMPS systems.

Switch mode power supply (SMPS) systems have many advantages over convention linear regulated power supplies. These advantages include smaller volume, better stability, and higher power efficiency. As a result, SMPS has found wide spread applications, such as televisions, set-top boxes, and video recorders, portable telephone chargers, personal digital assistants (PDAs), and even certain automated tooth brushes. In recently years, as light emitting diode (LED) technologies are becoming more mature, SMPS is widely used as drivers for LED devices, including in white-light bulb replacement applications.

However, conventional SMPS for LED lighting systems suffer from many limitations. As an example, when an SMPS is used to drive an LED, it generally needs to provide a constant output current in order to maintain stable brightness of the LED. When used with different AC power sources, for example, 110V vs. 220V, conventional LED lighting devices often need to be customized for the local power sources. Often a different control circuit is required, or an additional power source selection circuit is needed.

Moreover, unlike convention incandescent light bulbs, LEDs lighting devices do not behave like a purely resistive load in an AC circuit. Therefore, conventional LED light bulbs often do not provide desirable efficiency in the utilization of the AC power supply. The efficiency of an AC electric power system can be measured by "power factor". As used herein, the power factor of an AC electric power system is defined as the ratio of the real power flowing to the load to the apparent power in the circuit. Real power is the capacity of the circuit for performing work in a particular time. Apparent power is the product of the current and voltage of the circuit. A recent U.S. energy efficiency standard requires an LED with greater than 5 W power rating to have a power factor no lower than 0.7. An European standard requires an LED with more than 25 W to have a power factor higher than 0.94. Conventional devices often can not meet these standards.

Furthermore, in home or hotel lighting applications, traditional incandescent light bulbs are often used with a silicon dimmer device to adjust the brightness. Conventional LED lighting devices often can not accommodate a dimmer circuit, and can not provide the brightness adjustment capability.

Therefore, more efficient and cost-effective techniques for improving power supply systems for LED lighting applications are highly desired.

BRIEF SUMMARY OF THE INVENTION

Embodiments of the present invention provide methods and circuits for an SMPS to provide a constant average output current at a high power factor. In some embodiments, the same SMPS controller IC can be used over a wide range of AC input voltages, such as 110V or 220V power supplies, without additional AC source selection circuits. Moreover, in some embodiments, the SMPS controller are also configured to provide constant average output current and high power factor in LED lighting systems with an adjustable dimmer circuit, in which the input AC input power is cut off during certain phase angles. These features can lower production cost of the LED lighting system and lead to even wider applications.

In an embodiment, the high power factor can be achieved by generating a phase reference signal that has the same phase angle as the input AC current signal and controlling the envelop of peak points of the current pulses in the power supply to be in phase with the phase reference signal. In some embodiments, the current pulses allowed in the power switch are determined by the desired output drive current. Therefore, the power supply can operate with the same control circuit under different AC input voltage sources, for example, 110V vs. 220 V.

According to an embodiment of the present invention, a switch mode power supply (SMPS) system includes a rectifying circuit for coupling to an AC input voltage and a transformer having a primary winding for coupling to the rectifying circuit and a secondary winding coupled to the primary winding. The system also has a power switch coupled to the primary winding and a control circuit coupled to the power switch. The control circuit is configured to control current flow in the primary winding such that an envelop waveform formed by peak points of current pulses are in phase with the magnitude of the AC input voltage. Moreover, the SMPS system is configured to provide a constant average output current. In an embodiment, the SMPS system is configured to provide a constant average output current substantially independent of the magnitude of the AC input voltage.

In an embodiment, the SMPS system is configured to provide a constant average output current to an LED lighting apparatus. Here, the average output current is output current averaged over a time period of 10 milliseconds or longer. In another embodiment, the rectifying circuit is configured to output a rectified voltage having a magnitude that varies in phase with the magnitude of the AC input voltage. In some embodiments, the rectifying circuit includes a rectifying capacitor characterized by a capacitance that allows an output voltage of the rectifying circuit to retain phase information of the AC input voltage. In a specific embodiment, the rectifying circuit includes a rectifying capacitor having a capacitance in the range of about 10 to about 100 nF.

In some embodiments of the SMPS, the control circuit is configured to generate a phase reference voltage having a magnitude that is in phase with the rectified voltage, and the control circuit is also configured to turn off current flow in the primary winding when a voltage signal associated with the current in the primary winding reaches the phase reference voltage. In a specific embodiment, the phase reference voltage includes a sinusoidal voltage signal characterized by a frequency matching the frequency of the AC input voltage and a magnitude proportional to a desired output current.

In some embodiment, the control circuit includes a phase detection circuit and a reference voltage generation circuit. In another embodiment, each of the current pulses flowing in the primary winding is characterized by an on-time and an off-time, and the control circuit is configured to maintain a constant ratio of the on-time to the off-time. In a specific embodiment, the control circuit includes a control pulse generation circuit that is configured to charge a capacitor through a first current source and discharge the capacitor through a second current source. In another embodiment, the power supply system also includes a dimmer circuit that turns off the AC input voltage during a portion of each AC cycle, wherein the control circuit is configured to stop energy transfer to the secondary winding in the off portion of the AC cycle.

In another embodiment, the envelop formed by the peak points of the current pulses, Ipp(t), is described by the following expression:

$$Ipp(t)=(Ns/Np)*(1+1/K)*(\tfrac{1}{2})*\pi*Io*|\sin(2\pi ft)|$$

where Np is the coil turn number for the primary winding,
Ns is the coil turn number for the secondary winding,
f is the frequency of the input AC voltage,
Io is the desired average output current, and
K is the ratio of on-time to off-time for the current pulses in the primary winding.

According to another embodiment of the present invention, a control circuit for a switch mode power supply (SMPS) includes a first input terminal for coupling to a periodic input voltage, a second input terminal for sensing a current flow in the SMPS, an output terminal for providing a control signal to a power switch for regulating the current flow in the SMPS. The control circuit is configured to control current pulses in the SMPS such that an envelop formed by peak points of the current pulses are in phase with the periodic input voltage. The control circuit is further configured to enable the SMPS to provide a constant average output current.

In an embodiment, the above control circuit also includes a third input terminal for receiving a feedback signal associated with a current flow in the output portion of the SMPS. In an embodiment, the control circuit is configured to generate a phase reference voltage that is in phase with the periodic input voltage, and the control circuit is configured to turn off a current flow in the SMPS when a voltage signal received at the second input terminal reaches the phase reference voltage. In an embodiment, the phase reference voltage includes a sinusoidal voltage signal having a frequency matching the frequency and phase of the periodic input voltage and a magnitude proportional to a desired average output current of the SMPS.

In another embodiment, the control circuit includes a phase detection circuit and a reference voltage generation circuit. In an embodiment, the control circuit is configured to maintain a constant ratio of on-time to off-time for the current pulses. In another embodiment, the control circuit includes a control pulse generation circuit configured to charge a capacitor through a first current source and discharge the capacitor through a second current source.

In a specific embodiment of the control circuit, the envelop formed by the peak points of the current pulses, Ipp(t), is described by the following expression:

$$Ipp(t)=(Ns/Np)*(1+1/K)*(\tfrac{1}{2})*\pi*Io*|\sin(2\pi ft)|$$

where Np is the turn number for the primary winding,
Ns is the turn number for the secondary winding,
f is the frequency of the input AC voltage,
Io is the desired average output current, and
K is the ratio of on time to off time for the current pulses in the SMPS.

A further understanding of the nature and advantages of the present invention may be obtained by reference to the remaining portions of the specification and the drawings.

DETAILED DESCRIPTION OF THE INVENTION

Figure 1:
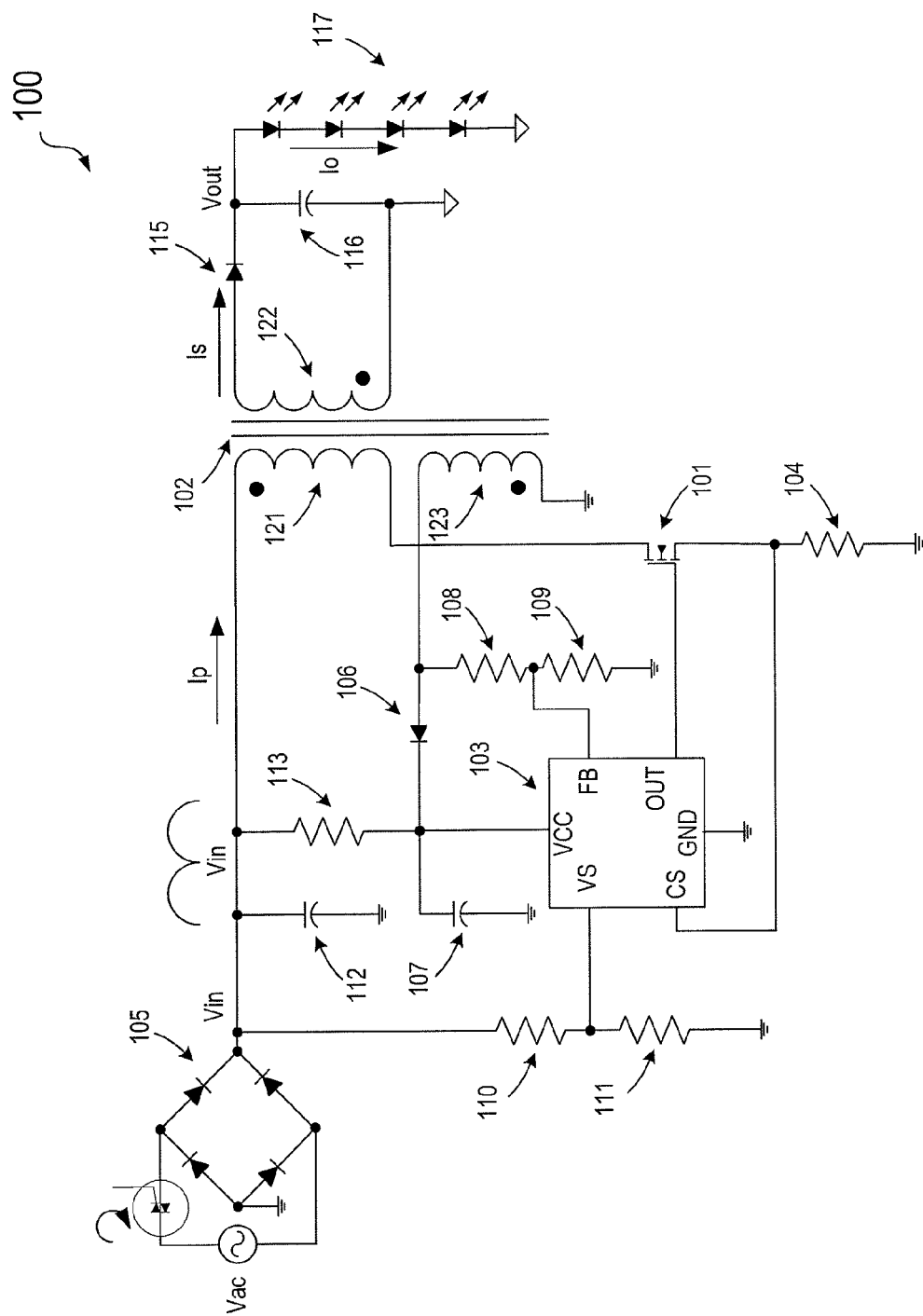
FIG. 1 is a simplified diagram illustrating a switch mode power supply (SMPS) driving a string of light emitting diodes (LED) according to an embodiment of the present invention.

FIG. 1 is a simplified diagram illustrating a switch mode power supply (SMPS) 100 driving a string of light emitting diodes (LED) 117 according to an embodiment of the present invention. In this example, SMPS 100 includes in a flyback converter. However, other types of converter architecture can also be used. As shown in FIG. 1, SMPS 100 includes a transformer 102, a power supply controller 103, and a power switch 101. Transformer 102 has a primary winding 121, a secondary winding 122, and an auxiliary winding 123, in which the black dots denote terminals having the same polarity. Primary winding 121 receives a rectified input Vin from a rectifying circuit that includes a diode bridge 105 and rectifies an AC input voltage Vac. SMPS 100 provides an output Vout from secondary winding 122 through rectifying diode 115 and capacitor 116. As shown, the output terminal Vout also provides an output current Io to LED string 117.

In an embodiment, controller 103 is a single chip SMPS controller and is configured to control the on-off states of power switch 101. In other embodiments, the controller can also be implemented in a multiple-chip configuration. In FIG. 1, power switch 101 is shown as a power MOSFET. But in alternative embodiments, other types of power switches, such as a bipolar power transistor, can also be used. The FB terminal in controller 103 is used for receiving a feedback signal FB, also referred to as $V_{FB}$, reflecting the operating state of output. In this example, the FB signal is taken from auxiliary winding 123 through a voltage divider formed by resistors 108 and 109. Controller 103 also has a CS terminal for sensing the current flowing through power switch 101 and primary winding 121. Moreover, controller 103 has a VS terminal for sensing the magnitude and phase of rectified AC signal Vin. In this embodiment, auxiliary winding 123 also provides operating power to controller 103 through a VCC terminal.

In embodiments of the invention, LED light systems can be configured to operate with a constant average current and achieve good power factor. In some embodiments, the system can operate in a wide range input AC voltage range under a given power output rating, without having to change parameters of the controller components or additional circuits for supply voltage selection.

In driving an LED lighting system, such as those used in illumination or backlight applications, it is desirable for the power supply to provide a constant current to the LED to maintain a stable brightness. Due to the effect of persistence of vision, human eyes are usually unable to detect brightness changes in a time period shorter than one millisecond. In some embodiments of the present invention, constant brightness can be maintained by a power supply configured to provide a substantially constant average output current at a time scale of 10 milliseconds or longer. In some embodiments, the output current does not have harmonic components with a frequency higher than 100 Hz. In LED driver applications using such power supplies, the brightness of the LED devices can appear to be constant, without brightness variations detectable to the human eye. In a time scale of less then 10 milliseconds, the average output current can be vary with time. The magnitude of the varying current is characterized by an envelop waveform that is in phase with the rectified input AC voltage.

In applications in which the input AC supply is characterized by a partial sinusoidal waveform (for example, when part of the phase angle is cut off by an adjustable dimmer IC), the control circuit of certain embodiments stop energy transfer during the phase region in which the sinusoidal waveform is missing. Thus, the average output current is adjusted according to the ratio of the missing sinusoidal region to the complete sinusoidal waveform, thereby enabling the control circuit to be used with conventional adjustable silicon dimmer devices to control the brightness of the LED. The operation of the power supply system is described below in conjunction with FIGS. 2-5.

Figure 2:
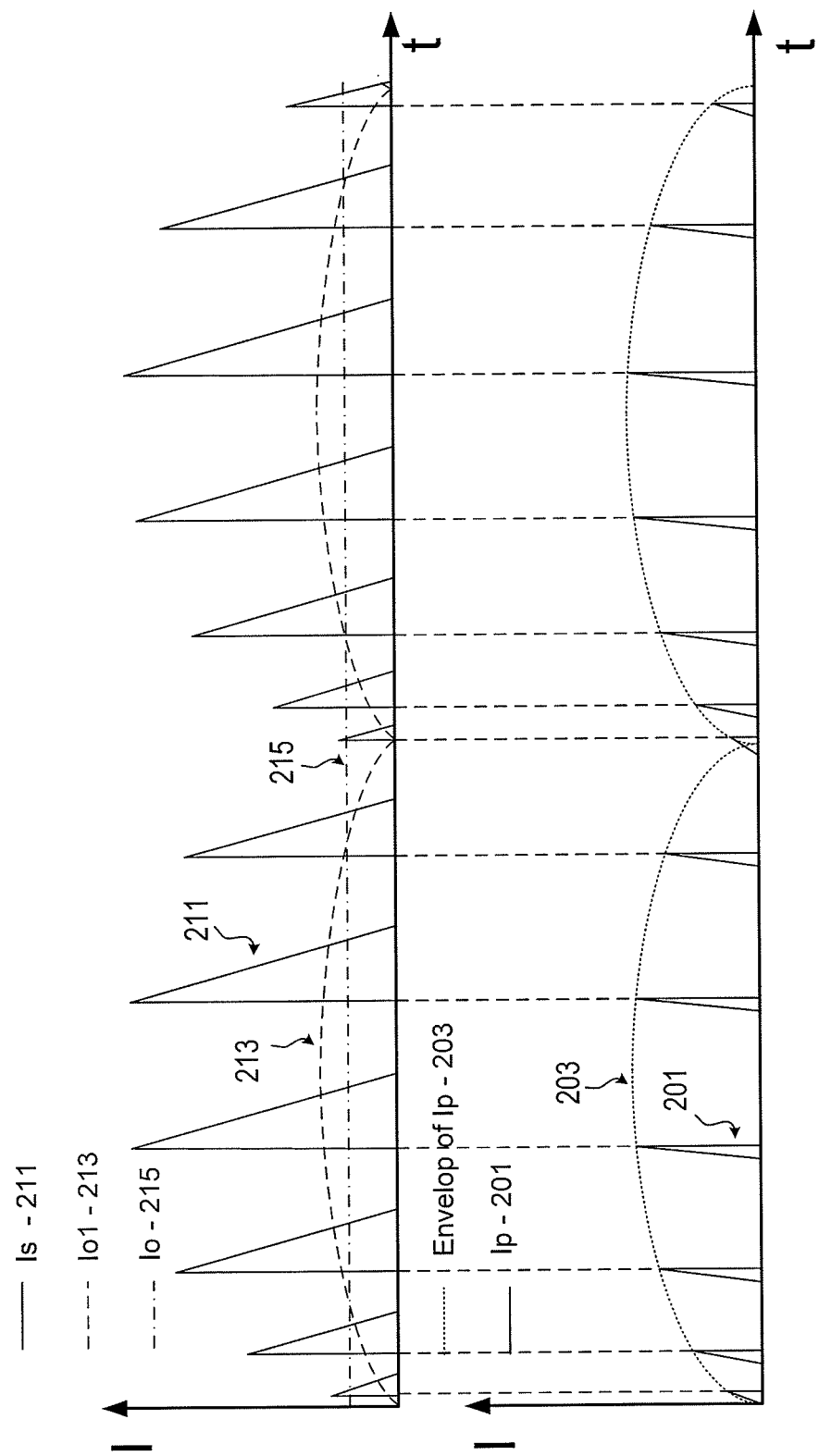
FIG. 2 is a wave form diagram illustrating the waveforms of the primary current and secondary current in the SMPS of FIG. 1 according to an embodiment of the present invention.

FIG. 2 is a diagram illustrating the waveforms of the primary current and secondary current in SMPS 100 in FIG. 1 according to an embodiment of the present invention. The lower diagram shows the primary current (Ip) pulses 201, which flows only when the power switch is turned on, and an envelop 203 of the peak current of primary current Ip. The upper diagram of FIG. 2 illustrates the waveforms for the secondary current. The instantaneous secondary current 211 flowing through rectifying diode 115 is shown as Is (211). The short duration average current Io1 is shown as 213. The long duration average current 215 is shown as Io. In some embodiments of the present invention, "short duration average" refers to current averaged over a time period shorter than 10 milliseconds, and "long duration average" refers to current averaged over a time period of 10 milliseconds or long It can be seen that the short-duration average secondary current pulses 213 is substantially in phase with the envelop of primary current pulses 203. Moreover, the long duration average secondary current 215 is substantially constant.

According to embodiments of the present invention, a method for controlling a switch mode power supply includes selecting a suitable secondary current Is (211) such that the envelop waveform of the average secondary current approaches the shape of Io1 (213) described above. In an embodiment, given the brightness of the LEDs, the average output current Io (215) needed to drive the LEDs can be determined. Then, a short-duration (under 10 msec) average output current Io1 (213) can be derived based on system power factor requirement and the measured AC input voltage phase angle. In an example, the desired waveform for Io1, the short-duration average secondary current, can be expressed as $(\frac{1}{2})*\pi*Io*|\sin(2\pi ft)|\pi$, where f is the frequency of the rectified AC supply voltage, for example, 100-120 Hz based on commercial AC supply of 50-60 Hz. Based on the profile of secondary current Is and parameters associated with system components such as the transformer, the shape of primary current Ip can be determined as described below.

Figure 3:
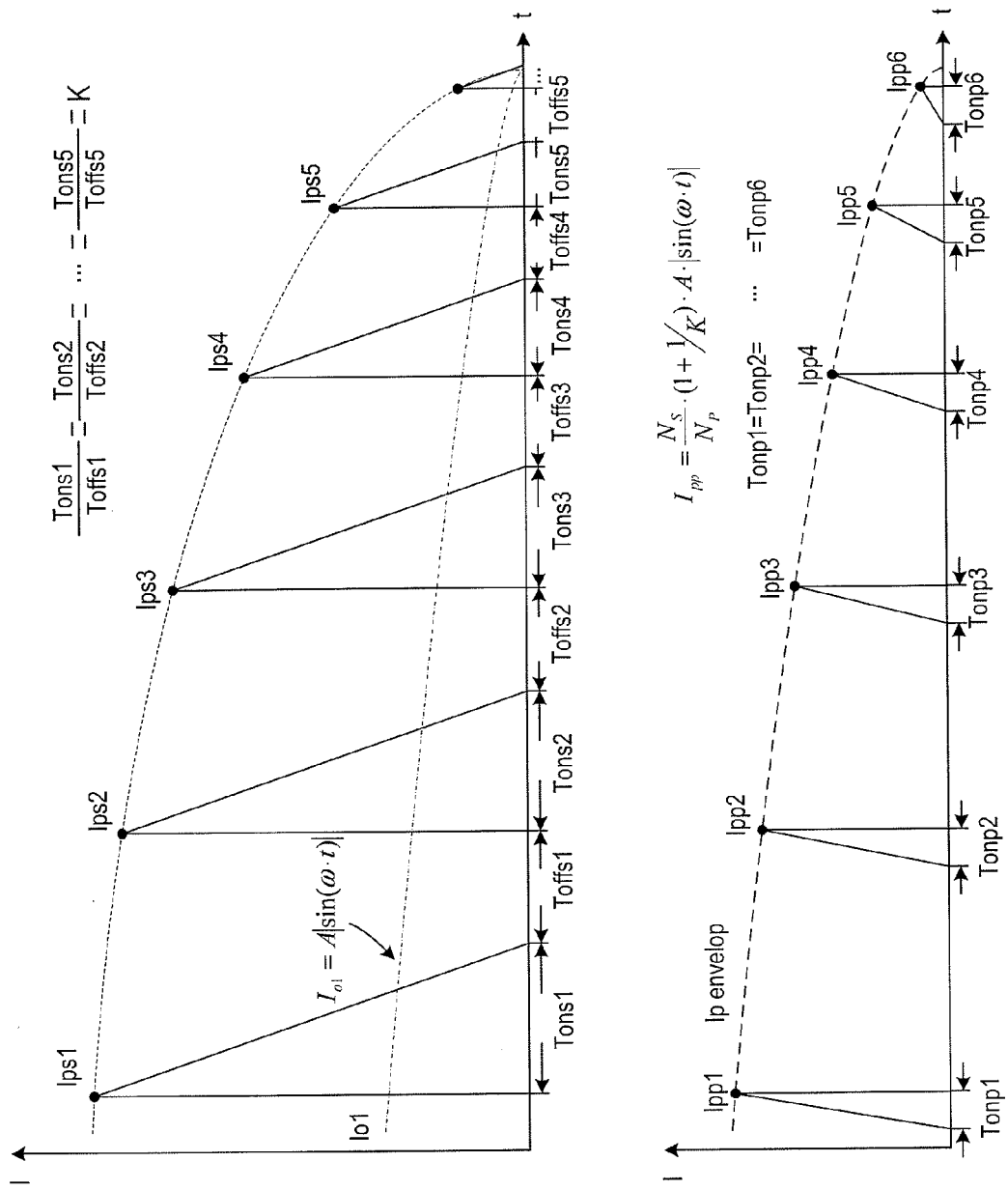
FIG. 3 is waveform diagrams illustrating the on-off time in the primary current and secondary current in the SMPS of FIG. 1 according to another embodiment of the present invention.

FIG. 3 illustrates the on-off times in the primary current and secondary current in an SMPS according to an embodiment of the present invention. Here, the turn-on time of the power switch is based on the required secondary current, and the duration of power switch conduction time is based on the envelop of peak primary current. As shown in the upper diagram of FIG. 3, the ratio of secondary side conduction time Tons to cutoff time Toff, Ton/Toff, is maintained at a constant K by the power supply controller. Let the envelop waveform of peak points of secondary current Ips(t) be described by equation (1), $$Ips(t)=(1+1/K)*(\tfrac{1}{2})*\pi*Io*|\sin(2\pi ft)| \quad (1)$$

Then, the short-duration (less than 10 msec) average of secondary current can be described by equation (2), $$Io1=(\tfrac{1}{2})*Io*\pi*|\sin(2\pi ft)| \quad (2)$$

In long-duration time scale, the average system output current is shown as equation (3), $$(f)*\int_0^{1/f}(Io1)dt=(f)*(\tfrac{1}{2})*\pi*Io*\int_0^{1/f}|\sin(2\pi ft)|dt=Io \quad (3)$$

In order to satisfy equation (1), the peak points of primary current Ipp(t) need to be included in the envelop waveform described by equation (4), $$Ipp(t)=(Ns/Np)*(1+1/K)*(\tfrac{1}{2})*\pi*Io*|\sin(2\pi ft)| \quad (4)$$

where Ns and Np are coil turn numbers of the secondary coil and the primary coil of the transformer, respectively. Thus, according to embodiments of the invention, by controlling primary side peak current Ipp(t) as prescribed by equation (4), the power supply can be configured to provide a constant average drive current to a load, such as a string of LEDs with a good power factor.

Let Va(t) denote the amplitude of the rectified input AC voltage, then the rectified input voltage can be expressed as follows:

$$Vin(t)=Va(t)*|\sin(2\pi ft)| \quad (5)$$

The on time of the primary conduction can be determined according to equation (5) and the target primary peak current Ipp(t) described above, Vin(t)=Lp*Ipp(t)/Tonp, where Lp is the inductance of the primary winding. Since the on time of primary current is determined to provide the desired secondary output current, the magnitude of the AC source voltage Vs would not affect the output of the SMPS. Therefore, the same controller can be used with different AC sources, for example, 110V or 220V.

In systems without a dimmer device, Va in equation (5) is a time-independent constant without a dimmer. In systems with a dimmer device, Va(t) may be zero in certain range of phase angle. In applications with a dimmer, Va(t) is zero during certain phase range. The controller can turn off the switch to prevent conducting when Va(t) is zero. In embodiments of the invention, the envelop of peak primary current Ipp(t) is proportional to Vin(t), regardless of the presence of a dimmer. Without a dimmer, Vin(t) is a complete rectified sinusoidal curve, and the envelop of Ipp(t) is also a complete rectified sinusoidal curve. With a dimmer, Vin(t) is an incomplete rectified sinusoidal curve, and the envelop of Ipp(t) is also an incomplete rectified sinusoidal curve, with the same dimmed phase angles Thus, in some embodiment, a high system power factor can be achieved and simultaneously allow the output average current to be controlled by the dimmer.

Figure 4:
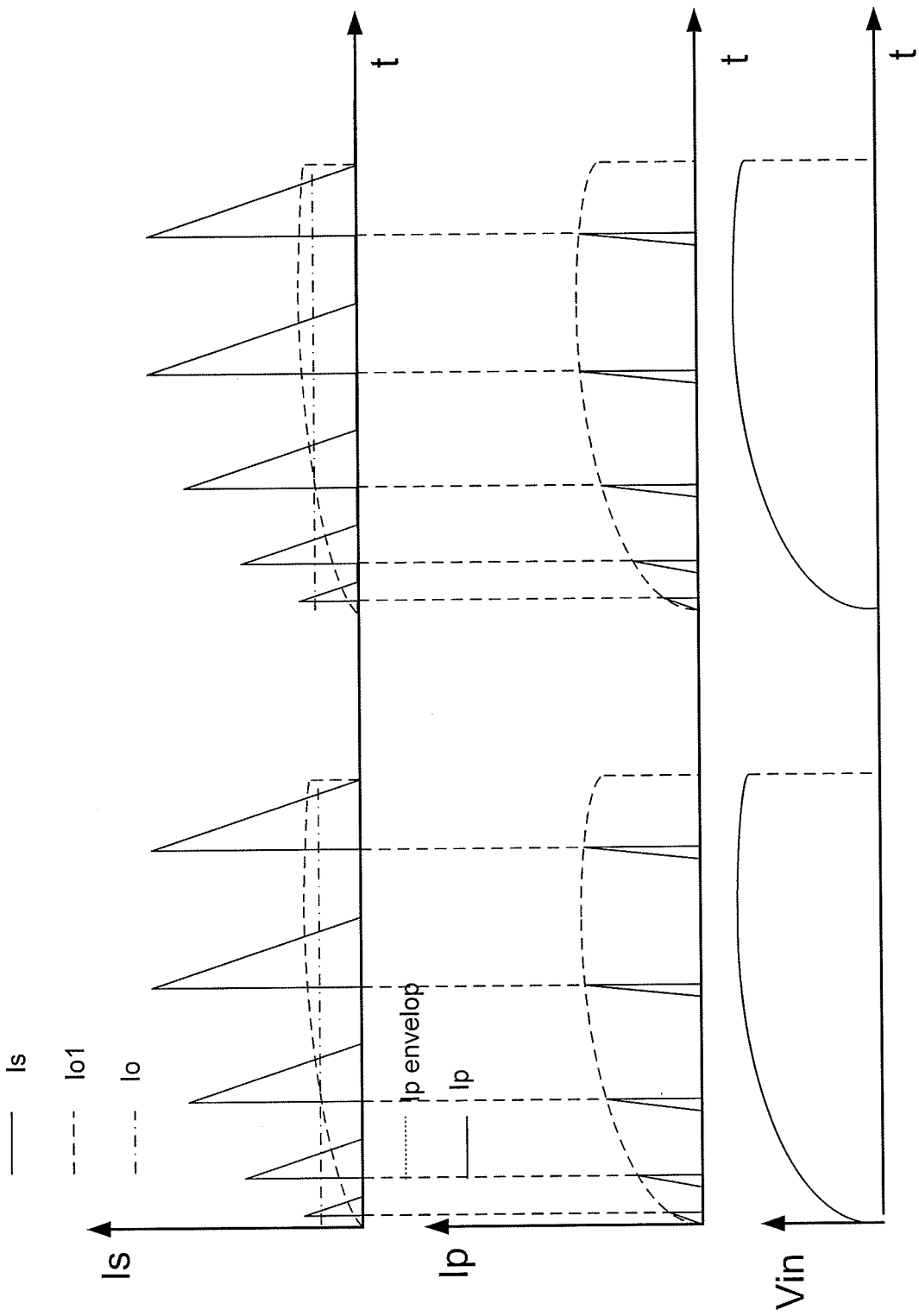
FIGS. 4 and 5 are waveform diagrams illustrating the on-off time of the primary current and secondary current in the SMPS of FIG. 1 operating with a dimmer device according to an embodiment of the present invention.
Figure 5:
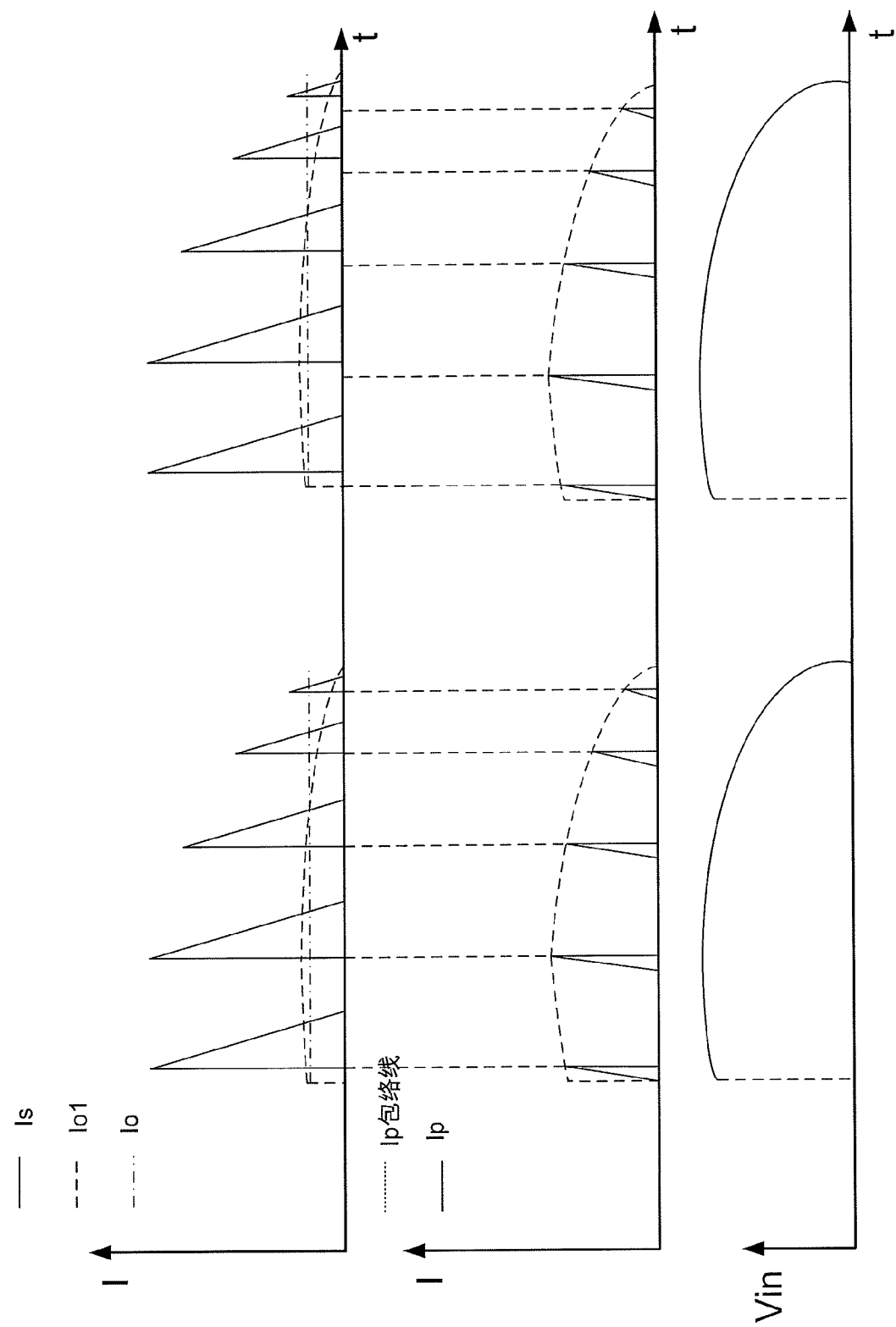

FIGS. 4 and 5 are waveform diagrams illustrating the on-off time of the primary current and secondary current in an SMPS operating with a dimmer circuit according to an embodiment of the present invention. As shown in FIGS. 4 and 5, Vin is the rectified input voltage, Vp is the primary current, and Vs is the secondary current. Certain phase angles of rectified sinusoidal curve Vin are cut off by a dimmer device. In FIG. 4, the input AC input voltage is cut off by the dimmer in a latter portion of the AC cycle, and in FIG. 5, the input AC input voltage is cut off by the dimmer in a front portion of the AC cycle. It can be seen that in both cases, the envelops of the primary and secondary current pulses are in phase with the AC input voltage.

Figure 6:
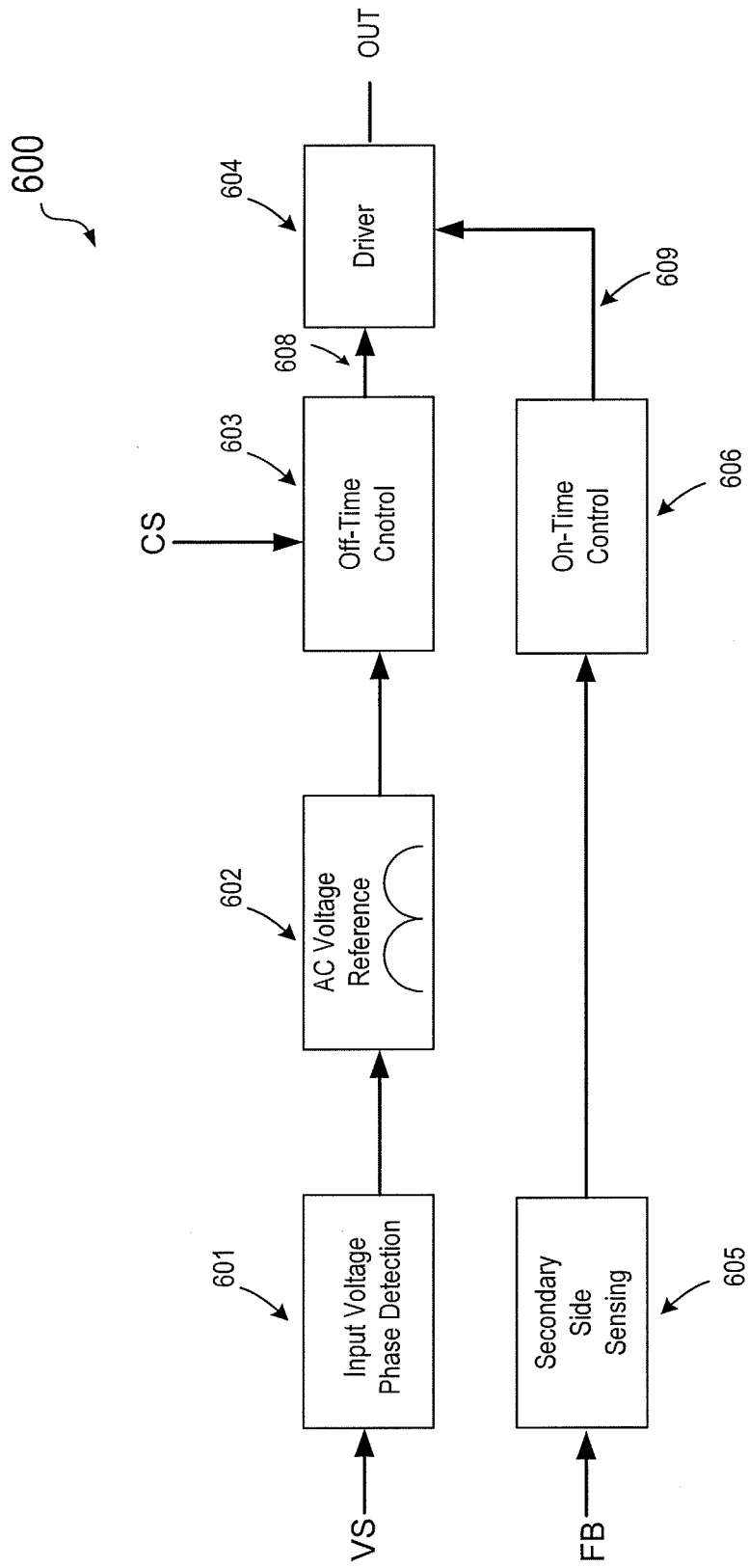
FIG. 6 is a simplified block diagram illustrating part of a power supply controller 600 according to an embodiment of the present invention.

FIG. 6 is a simplified block diagram illustrating part of a power supply controller 600 according to an embodiment of the present invention. In some embodiments, controller 600 can be used as controller 103 in power supply 100 in FIG. 1. In some embodiments, controller 600 is a single-chip controller having six terminals:

rectified input voltage sense terminal (VS);
secondary side feedback terminal (FB);
primary side current sense terminal (CS); and
output terminal for driving a power switch (OUT).
power terminal (VCC)—not shown in FIG. 6;
ground terminal (GND)—not shown in FIG. 6;

As shown in FIG. 6, controller 600 includes an input voltage phase detection module 601 coupled to the VS terminal for detecting the phase angle of the rectified input voltage Vin as shown in FIG. 1. Input voltage phase detection module 601 is coupled to an AC voltage reference module 602, which is configured for generating a reference voltage signal that has the same phase angle as the input AC voltage to the power supply Vac. As shown in FIG. 1, Vin is derived from rectifying circuit 105 and capacitor 112. To facilitate phase detection of Vin, it is desirable for Vin to retain certain time varying characteristic of Vac. Therefore, a relatively low capacitance is selected for capacitor 112. In some embodiments, the capacitance of capacitor 112 can be between 10 nF to 100 nF. In contrast, in some conventional power supplies, the rectifying capacitor can have a capacitance on the order of 5 uF. Of course, depending on the embodiments, capacitor 112 can be larger than 100 nF or smaller than 10 nF.

In FIG. 6, an off-time control module 603 is coupled to AC voltage reference module 602 to receive the reference voltage, and it is also coupled to the CS pin to receive the primary side current sense signal. Off-time control module 603 provides a first signal 608 to a driver module 604. Moreover, a secondary side sensing module 605 is couple to the FB pin to receive a feedback signal FB, which is related to the output condition on the secondary side. Secondary side sensing module 605 is coupled to an on-time control module 606, which provides a second signal 609 to driver module 604. As shown in FIG. 6, driver module 604 is coupled to the OUT pin to provide a control signal OUT for controlling the power switch. In a specific embodiment, controller 600 can be implemented in a low cost package, such as an SOT23-6 package.

Figure 7:
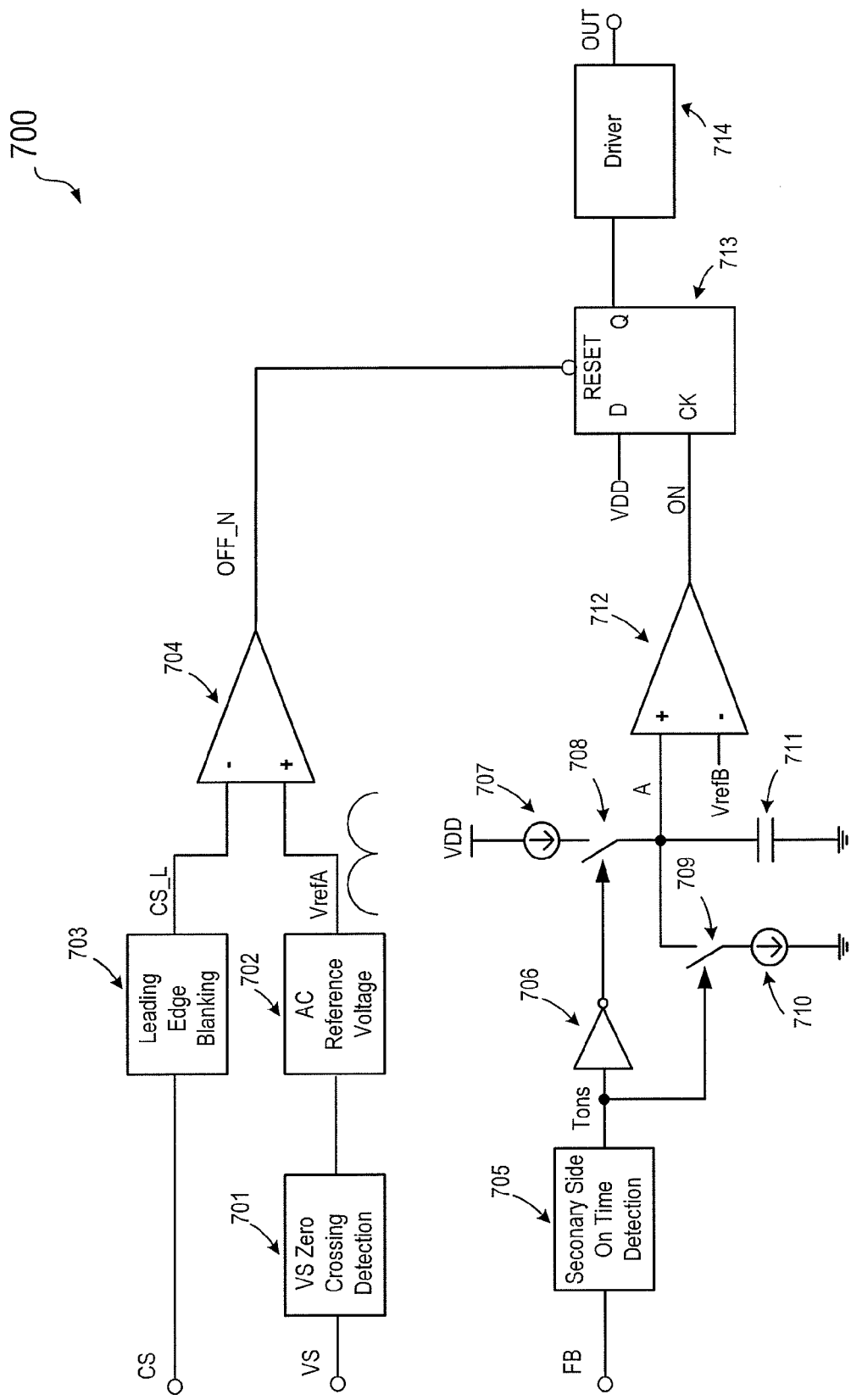
FIG. 7 is a simplified schematic/block diagram illustrating part of a power supply controller according to another embodiment of the present invention.
Figure 8:
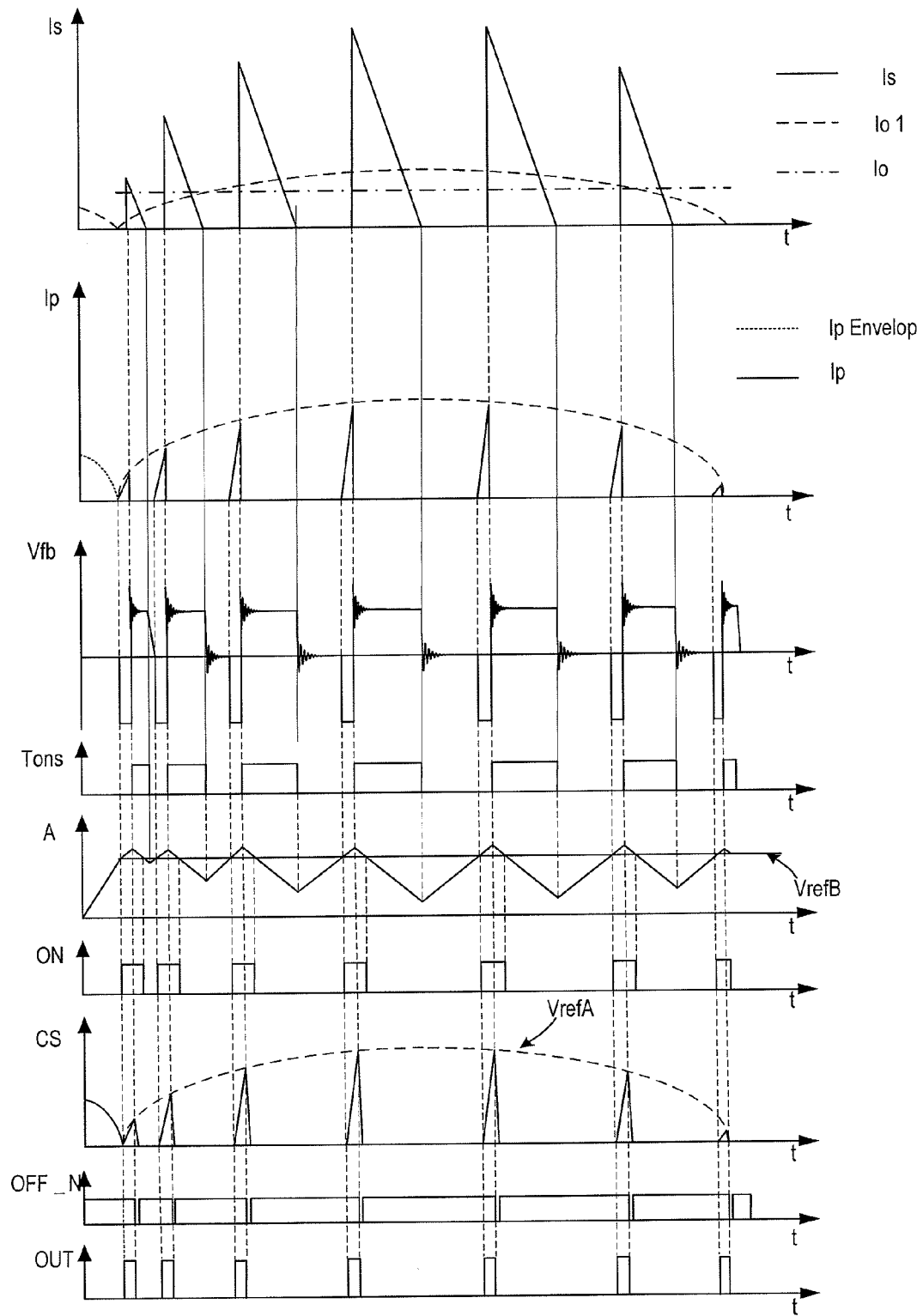
FIG. 8 show exemplary waveforms illustrating the operation of the power supply controller of FIG. 7 according to an embodiment of the present invention.

FIG. 7 is a simplified schematic/block diagram 700 illustrating part of a power supply controller 700 according to another embodiment of the present invention. FIG. 8 shows exemplary waveform diagrams illustrating various signals during the operation of the power supply controller in FIG. 7. In FIG. 7, VS zero crossing detection circuit 701 is coupled to AC reference voltage circuit 702 to output a reference voltage VrefA, which is a rectified sinusoidal signal having the same phase angle as rectified input signal at terminal VS. VrefA is coupled to the positive input of comparator 704. A leading edge blanking circuit 703 receives primary side current sense signal CS and provides a modified sense signal CS_L to the negative input of comparator 704. When CS_L reaches reference voltage VrefA, the power switch is to be turned off. At this time, comparator 704 outputs an OFF_N signal, which provides a negative pulse to reset D trigger circuit 713. In an embodiment, VrefA is related to the desired envelop waveform of peak primary current pulses as described in equation (4). Comparator 704 is configured to ensure that the peak current pulses conform to the desired envelop waveform.

In FIG. 7, secondary side on-time detection circuit 705 receives feedback signal Vfb at the FB pin from the secondary side and outputs a signal Tons, which reflects the on condition of the secondary side rectifier. For example, Tons is set at a high voltage level when the secondary side current is flowing. A high voltage level of Tons turns on switch 709 and, through inverter 706, turns off switch 708, causing a capacitor 711 to discharge through constant current source 710. On the other hand, when the secondary side rectifier is turned off, Tons is at a low voltage level, switch 709 is turned off, and switch 708 is turned on, causing capacitor 711 to be charged through constant current source 707. As shown in FIG. 7, comparator 712 is coupled to capacitor 711 to receive capacitor voltage A and a reference voltage VrefB. When voltage A of capacitor 711 reaches reference signal VrefB, the comparator output signal ON becomes high and causes the output Q of D trigger circuit 713 to be high, which, through driver circuit 714, produce a control signal OUT for turning on the power switch. Here, VrefB is selected such that the charging and discharging curve of capacitor 711 is described by a triangular waveform. Under this condition, the ratio of secondary side rectifier on-time to off-time "K" is a constant determined by current sources 707 and 710.

Figure 9:
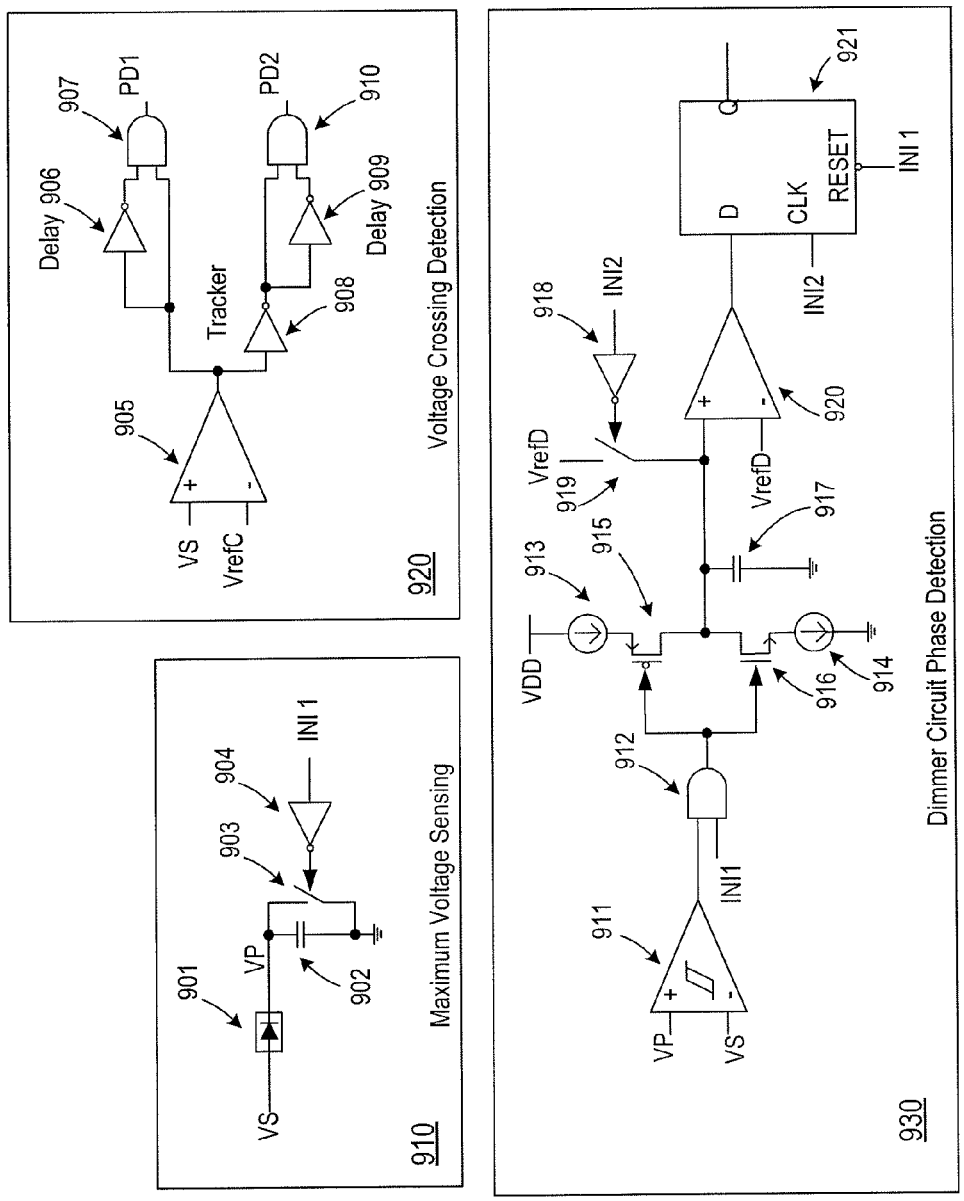
FIG. 9 shows simplified circuit diagrams illustrating circuit modules that can be used in zero crossing detection circuit of FIG. 7 according to an embodiment of the present invention.

FIG. 9 shows simplified circuit diagrams illustrating circuit modules that can be used in zero crossing detection circuit 701 of FIG. 7 according to an embodiment of the present invention. In FIG. 9, maximum voltage sensing module 910 includes a diode 901, a capacitor 902, a switch 903, and an inverter 904. Input voltage VS is coupled to capacitor 902 through diode 901. As VS rises, the voltage VP at capacitor 902 is charged up and follows VS. When VS reaches its maximum and starts to fall, diode 901 disconnects VS from capacitor 902, and VP is maintained by capacitor 902. Thus, the maximum voltage of VS in a cycle is recorded at capacitor 902. As also shown in circuit block 910, capacitor 902 can be discharged through switch 903 under the control of signal INI1 through inverter 904.

In FIG. 9, voltage crossing detection module 920 includes a comparator 905, which is coupled to VS at its positive input terminal and coupled to a reference voltage VrefC at its negative input terminal. The output signal of comparator 905 is labeled Tracker, which changes states when VS crosses VrefC, i.e., when VS changes from being higher than VrefC to being lower than VrefC, or vise versa. A delay circuit 906 and an AND gate 907 are used to produce a pulse signal PD1 when VS rises from a low level to a high level and crosses VrefC. Similarly, an inverter 908, a delay circuit 909, and an AND circuit 910 are used to produce a second pulse signal PD2 when VS drops from a high level to a low level and crosses VrefC.

Figure 10:
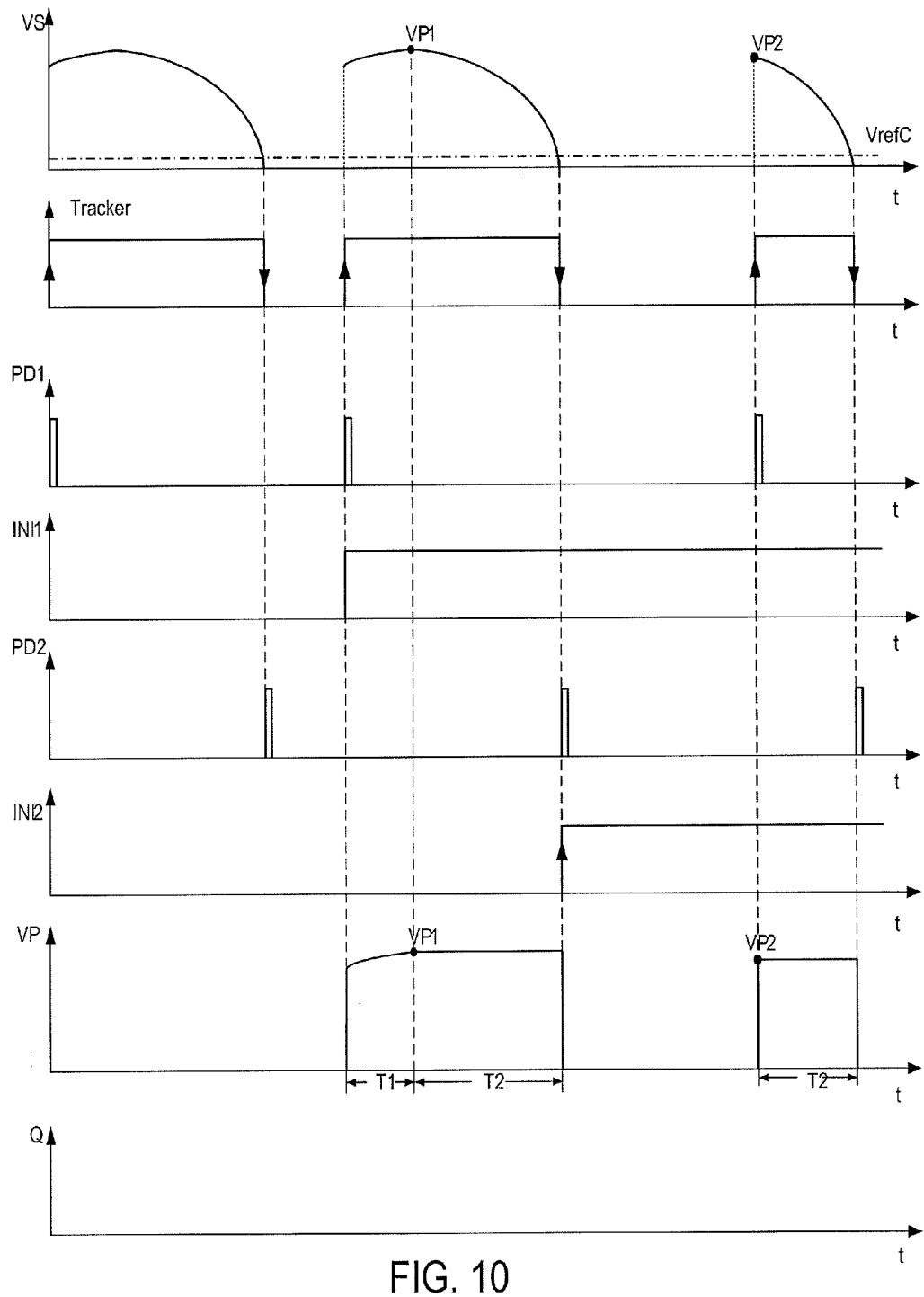
FIGS. 10 and 11 are waveform diagrams illustrating various signals associated with the circuits depicted in FIG. 9.
Figure 11:
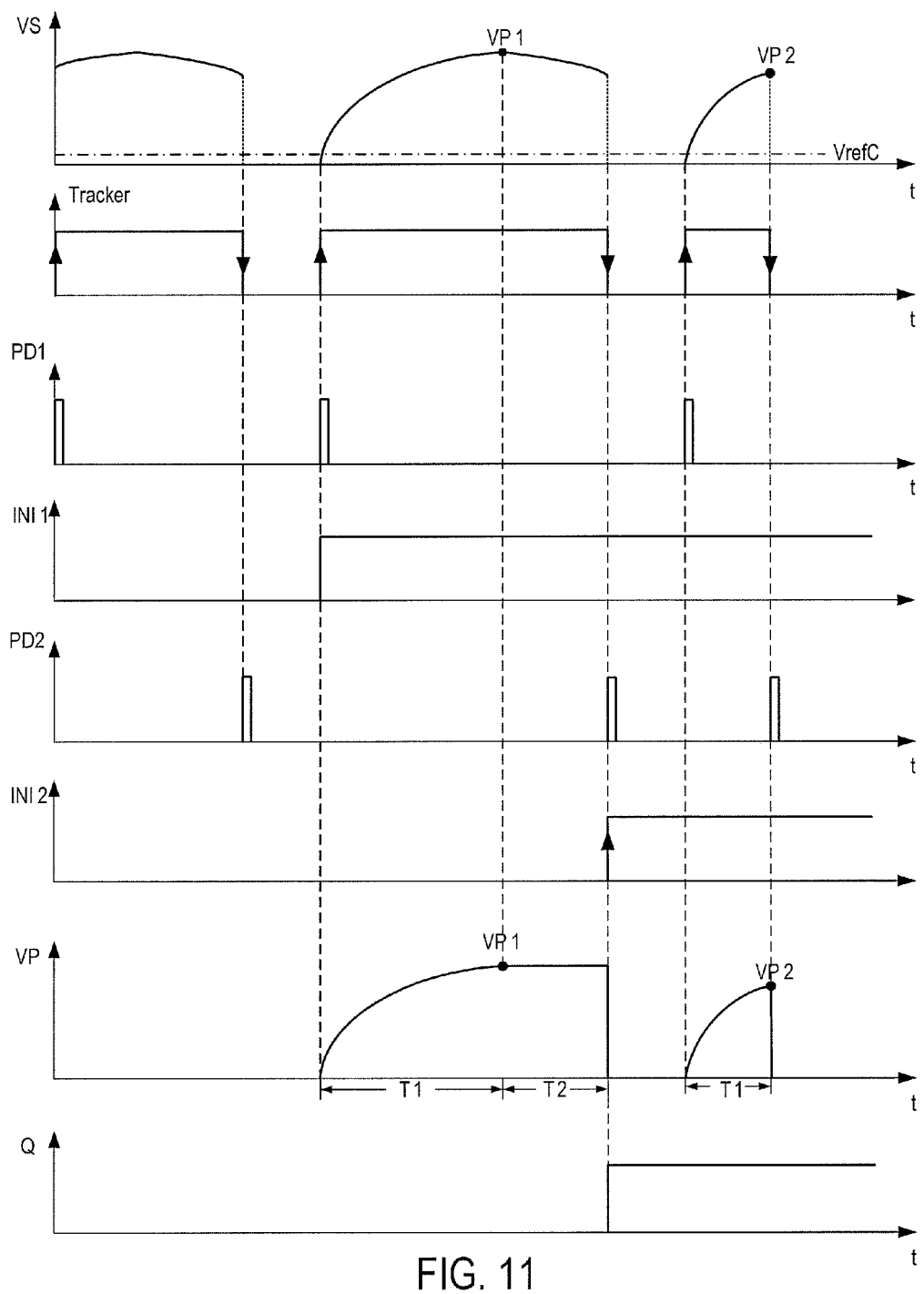

FIGS. 10 and 11 are waveform diagrams illustrating of the time variation of the signals associated with the circuits depicted in FIG. 9. FIG. 10 shows the signal waveforms when a front part of the AC input voltage is cut off by the dimmer circuit (also referred to as "front cut"), and FIG. 11 shows the waveforms when a latter part of the AC input voltage is cut off by the dimmer circuit (also referred to as "back cut"). Here, the waveform over a complete cycle of the input AC input voltage is used to determine whether a front portion or the latter portion of the AC voltage is cut off. As shown in FIGS. 10 and 11, signal INI1 goes from low to high when signal PD1 (or PD2) pulse arrives. INI2 goes from low to high when the next PD2 (or PD1) pulse arrives after INI1 has become high.

In an embodiment, VrefC in voltage crossing detection circuit 920 in FIG. 9 is selected to be close to zero, such that comparator 905 can determine zero crossing of VS. In FIGS. 10 and 11, T1 is the time it takes for VS to increase from VrefC to the peak VS voltage (designated as VP), and T2 is the time it takes for VS to decrease from VP to VrefC. If T1 is greater than T2, then it can be determined that a latter portion of the AC input voltage is chopped off. Conversely, If T1 is smaller than T2, then it can be determined that a front portion of the AC input voltage is chopped off.

In FIG. 9, dimmer circuit phase detection circuit 930 includes a comparator 911, with its positive input coupled to peak voltage VP produced by maximum voltage sensing circuit 910 and its negative input coupled to VS. The output of comparator 911 can be used to determine the duration in which VS rises from VrefC to VP and the duration in which VS falls from VP to VrefC. The output of comparator 911 is coupled to an AND gate 912, which also has signal INI1 as another input. A low comparator output voltage and a high INI1 signal indicate VS is in the process of rising from VrefC to VP. At this time, switch 916 is turned off and switch 915 is turned on, causing capacitor 917 to be charged by current source 913. Conversely, a high comparator output voltage and a high INI1 signal indicate VS is in the process of falling from VP to VrefC. At this time, switch 916 is turned on and switch 915 is turned off, causing capacitor 917 to be discharged by current source 914.

When INI2 signal is low, the positive input of comparator 920 is initially set to VrefD. During the time when Tracker is high, comparator 920 output signal can reflect the length of charging and discharging time, and the two time periods T1 and T2 described above. The output of comparator 920 is coupled to D trigger circuit 921, which is also coupled to INI2 at its clock terminal CLK. When the INI2 signal changes from low to high, the CLK terminal triggers the D trigger circuit and the output signal of comparator 920 enters the D terminal of the D trigger and is locked. Assuming the dimmer circuit cuts off the latter part of the input voltage cycle, it takes longer for VS to rise from VrefC to peak voltage VP than to fall from VP to VrefC. Under this condition, the output of comparator 920 is high, and the output of D trigger 921 is locked at high, indicating that pulse signal PD1 should be used to determine the zero-crossing of the input AC voltage. Conversely, if the dimmer circuit cuts off the early part of the input voltage cycle, the pulse signal PD2 should be used. The waveform diagrams of these signals are illustrated in FIGS. 10 and 11.

Figure 12B:
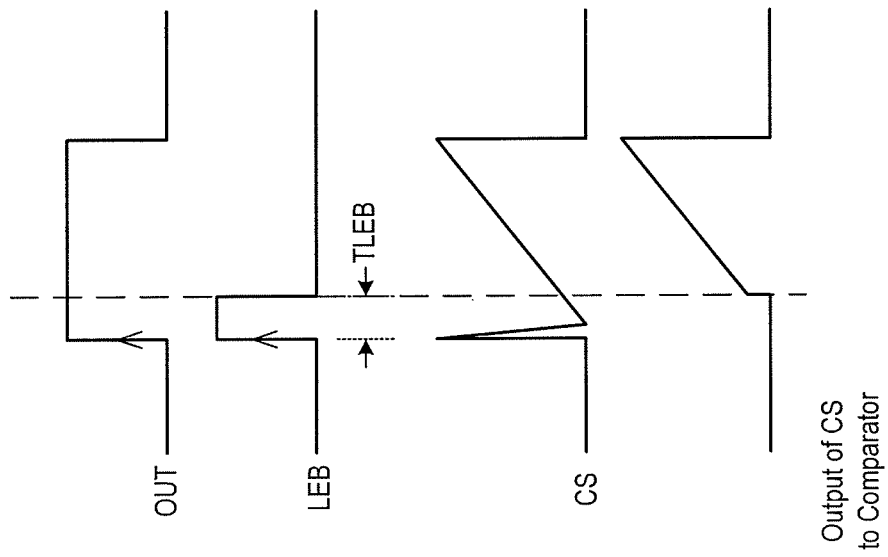
FIG. 12B is a waveform diagram illustrating the signals in the leading edge blanking circuit in FIG. 12A.
Figure 12A:
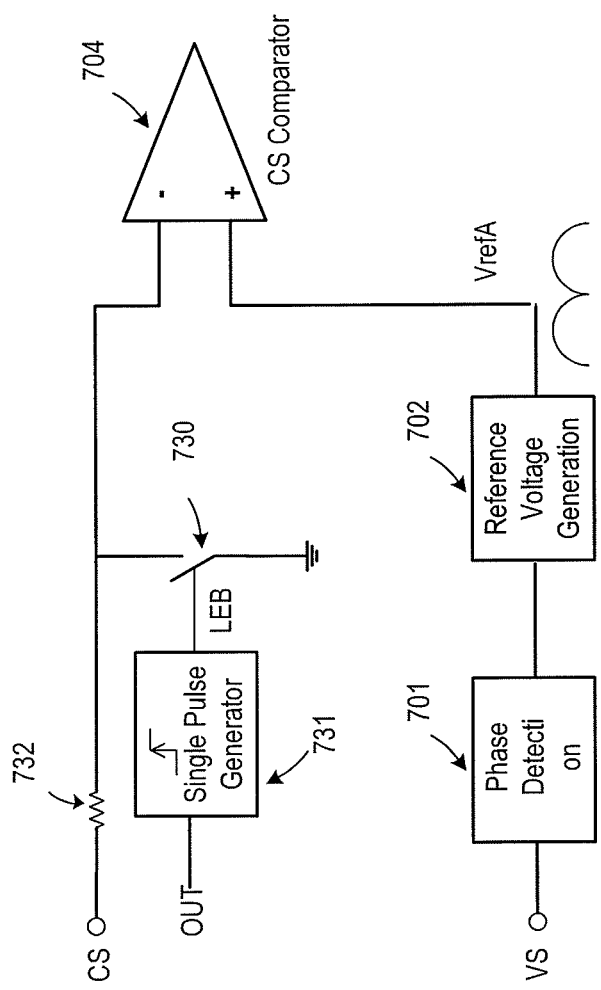
FIG. 12A is a simplified block/circuit diagram illustrating an exemplary implementation of the leading edge blanking circuit in FIG. 7 according to an embodiment of the present invention.

FIG. 12A is a simplified block/circuit diagram illustrating an exemplary implementation of the leading edge blanking circuit 703 in FIG. 7 according to an embodiment of the present invention. FIG. 12B is a waveform diagram illustrating various signals in FIG. 12A. FIG. 12B illustrates a spike in the CS signal, which represents the current in the power switch. The spike occurs at the leading edge of the OUT signal pulse, when the power switch changes from an off state to an on state. Leading edge blanking circuit block 703 in FIG. 7 is configured to filter this spike from the CS signal, with details depicted in FIG. 12A. As shown in FIG. 12A, a resistor 732 and a switch 730 are disposed between the CS signal and comparator 704. Switch 730 connects the CS signal to ground under the control of a pulse signal LEB, which is triggered at the leading edge of the OUT signal and lasts for a short duration TLEB. As shown in FIG. 12B, the spike in the CS signal is removed before it reaches comparator 704.

Figure 13:
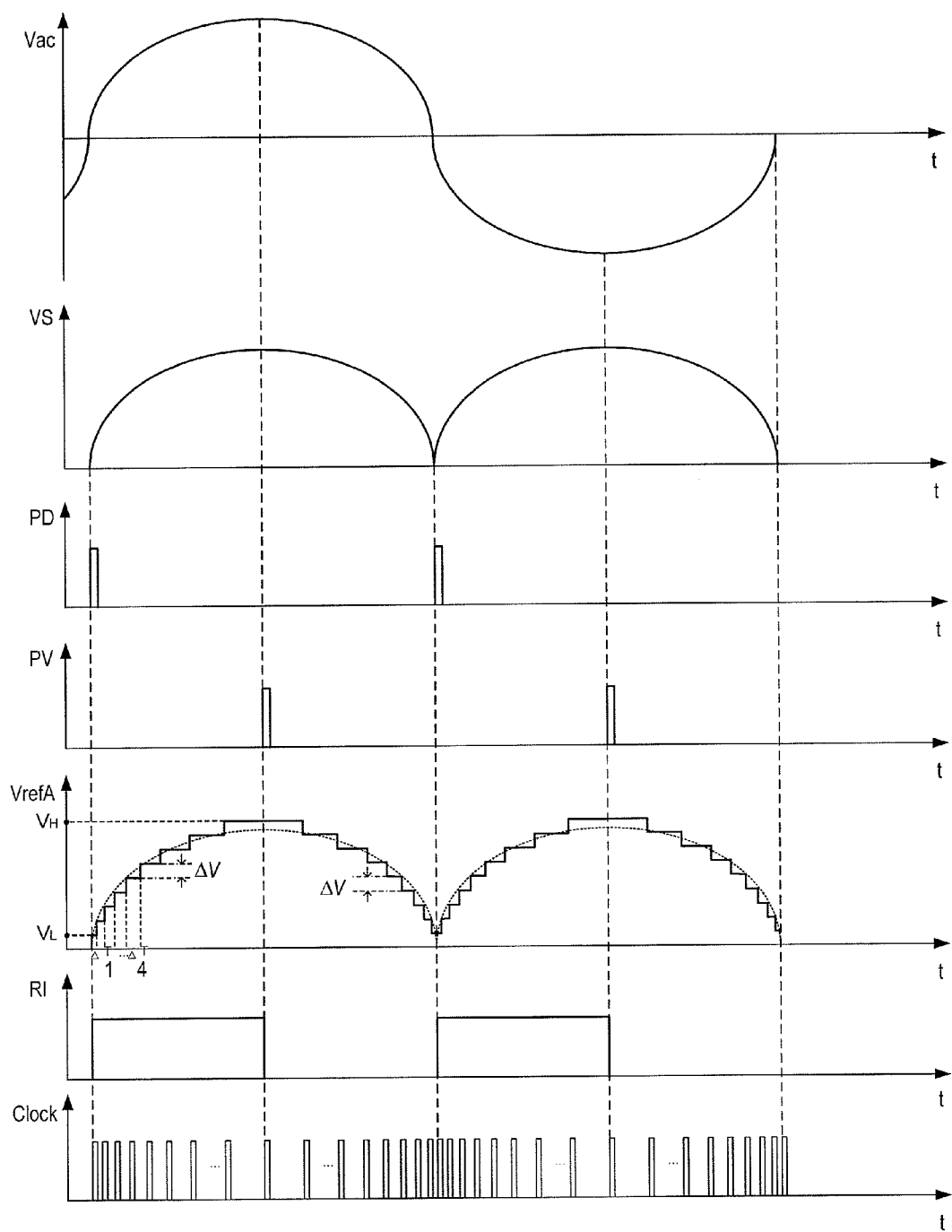
FIG. 13 is a waveform diagram illustrating the signals involved in the generation of AC reference signal according to an embodiment of the present invention.

FIG. 13 is a waveform diagram illustrating the various signals involved in the generation of AC reference signal according to an embodiment of the present invention. In FIG. 13, Vac is the AC input voltage to the power supply system and can be provided through, for example, a power outlet in a city power system. VS is the rectified AC signal, and PD and PV are pulse signals indicating the zero-crossing point and the peak point of Vac, respectively. RI is a signal derived from PD and PV. Here, a high level of RI indicates the time period in which the AC reference signal rises from a minimum VL to a maximum VH. Conversely, a low level of RI indicates the time period in which the AC reference signal rises from the maximum VH to the minimum VL. In FIG. 13, Clock is a pulse signal having a fixed pulse width, but variable frequency. The Clock signal is derived from the rectified input voltage Vin at terminal VS and is used for generating the VrefA signal, which has the same phase as Vin. The Clock signal is used in controlling the charging of a capacitor for the generation of the VrefA reference signal. When RI is high, every Clock pulse causes the capacitor to be charged higher by a fixed voltage $\Delta V$. Conversely, when RI is low, every Clock pulse causes the capacitor to be discharged lower by a fixed voltage $\Delta V$. Thus, the frequency of the Clock pulse determines the rising and falling shapes of reference signal VrefA. As a result, VrefA will follow the shape of VS and maintain the same phase angle as VS.

Figure 14:
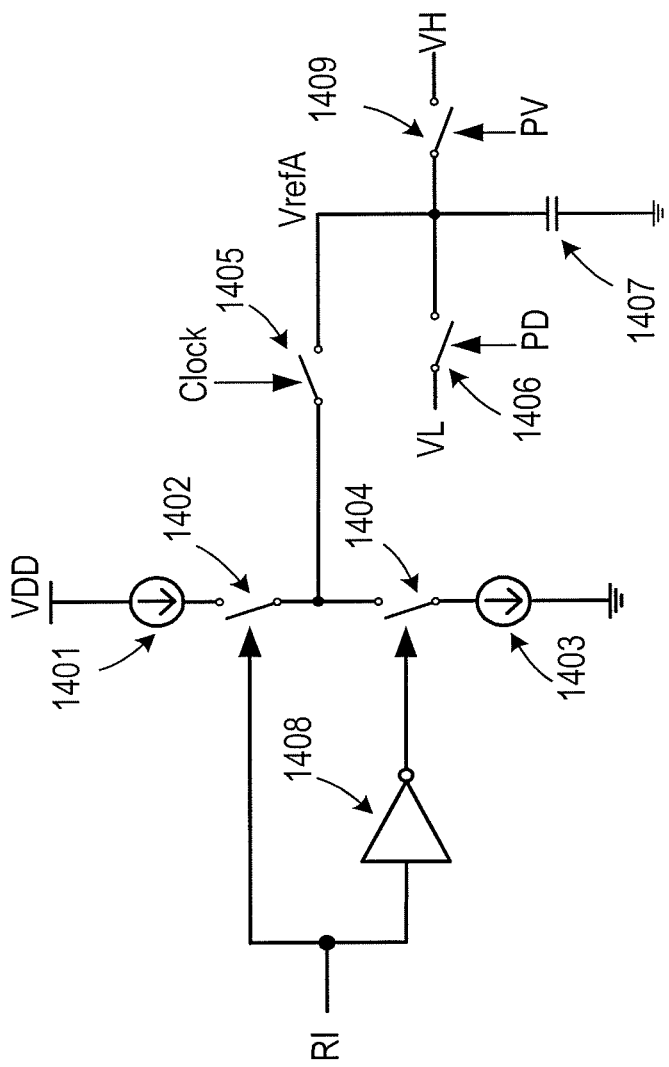
FIG. 14 is a simplified circuit diagram for generating the AC reference voltage as depicted in FIG. 13.

FIG. 14 is a simplified circuit diagram illustrating a circuit for generating the AC reference voltage as described in FIG. 13. As shown, circuit 1400 includes current sources 1401 and 1403 providing equal current for charging and discharging capacitor 1407. Current sources 1401 and 1403 are controlled by switches 1401 and 1404, respectively, which in turn are controlled by an input signal RI and inverter 1408. When RI is high, switch 1402 is on and switch 1404 is off. Under this condition, every Clock pulse causes current source 1401 to charge capacitor 1407 by a fixed amount of electric charges $Q=I*Ton$, and causes VrefA to rise by a voltage $\Delta V=Q/C$, where I is the current in current sources 1401 and 1403, Ton is the on time, or the pulse width, of the Clock pulse, and C is the capacitance of capacitor 1407. Conversely, when RI is low, switch 1401 is on and switch 1402 is off. Every Clock pulse causes current source 1403 to discharge capacitor 1407 by a fixed amount of electric charges $Q=I*Ton$, and causes VrefA to fall by a voltage $\Delta V=Q/C$. By controlling the frequency of the Clock pulse, VrefA can be generated exhibit the shape of a rectified sinusoidal wave.

The above description includes specific examples used to illustrate various embodiments. It is understood, however, that the examples and embodiments described herein are for illustrative purposes only. Various modifications or changes in light thereof will be suggested to persons skilled in the art and are to be included within the spirit and purview of this invention.

What is claimed is:

1. A switch mode power supply (SMPS) system, comprising:
- a rectifying circuit for coupling to an AC input voltage for providing a rectified AC voltage having a magnitude that varies in phase with the magnitude of the AC input voltage;
- a transformer having a primary winding for coupling to the rectifying circuit and a secondary winding coupled to the primary winding;
- a power switch coupled to the primary winding; and
- a control circuit coupled to the power switch, the control circuit being configured to provide a reference voltage that is in phase with the rectified AC voltage and has a magnitude selected to produce a desired output, the control circuit being configured to control current pulses in the primary winding such that an envelope waveform formed by peak points of the current pulses are in phase with the AC input voltage;
- wherein the reference voltage is a sinusoidal voltage signal $|VrefA|*|\sin(2\pi ft)|$ (V) characterized by:
- a frequency $2\pi f$ matching the frequency of the AC input voltage; and
- a magnitude $|VrefA|$ (V) selected to produce a desired output current;
- wherein the SMPS system is configured to provide a constant average output current,
- wherein the control circuit is configured to turn off current flow in the primary winding when a voltage signal associated with the current in the primary winding reaches the reference voltage.

2. The power supply system of claim 1, wherein the SMPS system is configured to provide a constant average output current substantially independent of a magnitude of the peak voltage of the AC input voltage.

3. The power supply system of claim 1, wherein the SMPS system is configured to provide a constant average output current to an LED lighting apparatus, wherein the average output current is output current averaged over a time period of 10 milliseconds or longer.

4. The power supply system of claim 1, wherein the rectifying circuit comprises a rectifying capacitor characterized by a capacitance that allows an output voltage of the rectifying circuit to retain phase information of the AC input voltage.

5. The power supply system of claim 1, wherein the rectifying circuit comprises a rectifying capacitor having a capacitance in the range of about 10 to about 100 nF.

6. The power supply system of claim 1, wherein the control circuit comprises a phase detection circuit and a reference voltage generation circuit.

7. The power supply system of claim 1, wherein the control circuit is configured to receive a feedback signal associated with a current flow in the secondary winding; and
- the control circuit is configured to maintain a constant ratio of Tons/Toffs, the on time and off time of secondary current, based on the feedback signal, thereby causing the SMPS to provide a constant average output current.

8. The power supply system of claim 7, wherein the control circuit is configured to charge a capacitor using a first current source during Toffs, and discharge the capacitor using a second current source during Tons, and the constant ratio is based on the ratio of the first current source to the second current source.

9. The power supply system of claim 1, wherein the envelope formed by the peak points of the current pulses, Ipp(t), is described by the following expression:

$$Ipp(t)=(Ns/Np)*(1+1/K)*(1/2)*\pi*Io*|\sin(2\pi ft)| \quad (A)$$

where Np is the coil turn number for the primary winding,
Ns is the coil turn number for the secondary winding,
f is the frequency of the input AC voltage (Hertz),
Io is the desired average output current (A), and
K is the ratio of on-time to off-time for the current pulses in the primary winding.

10. The power supply system of claim 1, further comprising a dimmer circuit that turns off the AC input voltage during a portion of each AC cycle, wherein the control circuit comprises a dimmer phase detection circuit and is configured to stop energy transfer to the secondary winding in said portion of the AC cycle.

11. A control circuit for a switch mode power supply (SMPS), comprising:
- a first input terminal for coupling to a periodic input voltage for receiving a rectified AC voltage;
- a second input terminal for sensing a current flow in a primary winding of the SMPS;
- a third input terminal for receiving a feedback signal associated with a current flow in a secondary winding of the SMPS;
- an output terminal for providing a control signal to a power switch for regulating the current flow in the SMPS; and
- a phase detection circuit and a reference voltage generation circuit configured to provide a reference voltage that is in phase with the rectified AC voltage and has a magnitude selected to produce a desired output;
- wherein the control circuit is configured to control current pulses in the primary winding of the SMPS such that an envelope formed by peak points of the current pulses are in phase with the periodic input voltage,
- wherein the control circuit is configured to determine a time period Toffs, when the feedback signal indicates that the current flow in the secondary winding is off, and a time period Tons, when the feedback signal indicates that the current flow in the secondary winding is on;
- wherein the control circuit is configured to maintain a constant ratio of Tons/Toffs, the on time and off time of secondary current, respectively, thereby causing the SMPS to provide a constant average output current,
- wherein the phase detection circuit comprises a zero crossing detection circuit, and the reference voltage generation circuit comprises a sinusoidal voltage generation circuit.

12. The control circuit of claim 11, further comprising a control pulse generation circuit configured to:
- charge a capacitor using a first current source during the time period Toffs; and
- discharge the capacitor using a second current source during the time period Tons;
- wherein and the constant ratio of Tons/Toffs is based on the ratio of the first current source and the second current source.

13. The control circuit of claim 11, wherein the control circuit is configured to turn off a current flow in the SMPS when a voltage signal received at the second input terminal reaches the reference voltage.

14. The power supply system of claim 12, wherein the reference voltage comprises a sinusoidal voltage signal $|VrefA|*|\sin(2\pi ft)|$ (V) characterized by:
- a frequency $2\pi ft$ matching the frequency of the AC input voltage; and a magnitude |VrefA| (V) selected to produce a desired output current.

15. The control circuit of claim 11, wherein the envelope formed by the peak points of the current pulses, Ipp(t), is described by the following expression:

$$Ipp(t) = (Ns/Np)*(1+1/K)*(1/2)*\pi*Io*|\sin(2\pi ft)| \quad \text{(A)}$$

where Np is the coil turn number for a primary winding of the SMPS,

Ns is the coil turn number for a secondary winding of the SMPS, f is the frequency of the periodic input voltage (Hertz), Io is the desired average output current (A), and K is the ratio of on time to off time for the current pulses in the SMPS.

16. A control circuit for a switch mode power supply (SMPS), comprising:
 a first input terminal for coupling to a periodic input voltage for receiving a rectified AC voltage;
 a second input terminal for sensing a current flow in the SMPS; and
 an output terminal for providing a control signal to a power switch for regulating the current flow in the SMPS;
 a phase detection circuit and a reference voltage generation circuit configured to provide a reference voltage that is in phase with the rectified AC voltage and has a magnitude selected to produce a desired output;
 wherein the reference voltage generation circuit includes:
  a capacitor;
  first and second current sources for charging and discharging the capacitor, respectively; and
  a clock signal having a series of clock pulses derived from the rectified AC voltage and configured to control charging and discharging of the capacitor to provide the reference voltage;
 wherein the control circuit is configured to control current pulses in the SMPS such that an envelope formed by peak points of the current pulses are in phase with the periodic input voltage, and the control circuit is configured to enable the SMPS to provide a constant average output current.

* * * * *